(12) United States Patent
Zheng et al.

(10) Patent No.: US 12,515,714 B2
(45) Date of Patent: Jan. 6, 2026

(54) PREDICTION-TYPE INTELLIGENT VEHICLE DECISION CONTROL METHOD AND APPARATUS, VEHICLE, AND STORAGE MEDIUM

(71) Applicant: TSINGHUA UNIVERSITY, Beijing (CN)

(72) Inventors: Sifa Zheng, Beijing (CN); Ziqing Gu, Beijing (CN); Haitong Ma, Beijing (CN); Shengbo Li, Beijing (CN); Jianqiang Wang, Beijing (CN); Qing Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 110 days.

(21) Appl. No.: 18/399,737

(22) Filed: Dec. 29, 2023

(65) Prior Publication Data

US 2024/0149920 A1     May 9, 2024

Related U.S. Application Data

(63) Continuation of application No. PCT/CN2022/131722, filed on Nov. 14, 2022.

(30) Foreign Application Priority Data

Nov. 15, 2021   (CN) .................... 202111349214.6

(51) Int. Cl.
*B60W 60/00*       (2020.01)
*B60W 50/00*       (2006.01)
*B60W 50/06*       (2006.01)

(52) U.S. Cl.
CPC .... *B60W 60/0027* (2020.02); *B60W 50/0097* (2013.01); *B60W 50/06* (2013.01); *B60W 2554/404* (2020.02); *B60W 2556/00* (2020.02)

(58) Field of Classification Search
CPC ......... B60W 60/0027; B60W 50/0097; B60W 50/06; B60W 2556/00; B60W 2554/404
See application file for complete search history.

(56) References Cited

U.S. PATENT DOCUMENTS

2013/0261947 A1*  10/2013 Yamashiro ............. G08G 1/163
                                                      701/300
2020/0172093 A1*  6/2020 Kum .................. B60W 30/0956
(Continued)

FOREIGN PATENT DOCUMENTS

CN       109855639 A       6/2019
CN       110568760 A       12/2019
(Continued)

OTHER PUBLICATIONS

International Search Report dated Dec. 16, 2022 in International Application No. PCT/CN2022/131722. English translation attached.
(Continued)

*Primary Examiner* — Naeem Taslim Alam

(57) ABSTRACT

A prediction-type intelligent vehicle decision control method and apparatus, a vehicle, and a storage medium are provided. The method includes: establishing a prediction model for surrounding traffic participants based on map information and historical tracks of the traffic participants, and performing parameter initialization on the prediction model by using a labeled data set to generate an initial surrounding vehicle motion prediction model; cyclically updating the initial surrounding vehicle motion prediction model according to continuous interaction data with an environment by taking a driving target of an intelligent vehicle as an optimization object, so as to generate a final surrounding vehicle motion prediction model; and embedding the final surrounding vehicle motion prediction model into a decision control system of the intelligent vehicle, the decision control system generating a decision control (Continued)

instruction according to a predicted surrounding vehicle motion and controlling the intelligent vehicle to execute the decision control instruction.

16 Claims, 9 Drawing Sheets

(56) References Cited

U.S. PATENT DOCUMENTS

| | | | | |
|---|---|---|---|---|
| 2020/0209860 | A1* | 7/2020 | Zhang | G05D 1/0276 |
| 2021/0080955 | A1* | 3/2021 | Wilkinson | B60W 60/0011 |
| 2021/0152997 | A1* | 5/2021 | Manivasagam | G08G 1/163 |

FOREIGN PATENT DOCUMENTS

| | | |
|---|---|---|
| CN | 110751847 A | 2/2020 |
| CN | 110853393 A | 2/2020 |
| CN | 111009153 A | 4/2020 |
| CN | 111267846 A | 6/2020 |
| CN | 112373485 A | 2/2021 |
| CN | 112550314 A | 3/2021 |
| CN | 113044064 A | 6/2021 |
| CN | 113110359 A | 7/2021 |
| CN | 113386795 A | 9/2021 |
| CN | 114084155 A | 2/2022 |

OTHER PUBLICATIONS

The First Office from corresponding Chinese Application No. 202111349214.6, dated Jul. 20, 2023. English translation attached.
The Grant Notice from corresponding Chinese Application No. 202111349214.6, dated Sep. 22, 2023. English translation attached.

* cited by examiner

PREDICTION-TYPE INTELLIGENT VEHICLE DECISION CONTROL METHOD AND APPARATUS, VEHICLE, AND STORAGE MEDIUM

CROSS-REFERENCE TO RELATED APPLICATION

The present application is a continuation of International Application No. PCT/CN2022/131722, filed on Nov. 14, 2022, which is based on and claims the priority of a Chinese patent application No. 202111349214.6, filed on Nov. 15, 2021, which are incorporated herein by reference in their entirety.

TECHNICAL FIELD

The present application relates to the technical field of automatic driving applications, and particularly to a prediction-type intelligent vehicle decision control method and apparatus, vehicle, and storage medium.

BACKGROUND

Dynamics and complexity of traffic environment and the interaction between traffic participants have brought great challenges to a decision control system of intelligent vehicles. The uncertainty of the movement trend of the traffic participants (e.g., the possible future tracks or intentions) have an indispensable impact on the decision control results of intelligent vehicles. Therefore, it is of great significance to accurately predict the movement trend of the traffic participants around for decision control of the intelligent vehicles in dynamic traffic environment.

In the related art, a prediction process and a decision control process are often decomposed to form a "prediction-decision control" open-loop type solution. Secondly, most of the previous methods capture the spatial or temporal information by rasterizing encoding of map information and relying on a receptive field or memory mechanism to obtain diverse prediction results in the probabilistic sense.

However, the limitation of the local structure of the receptive field or the length of the memory module makes it difficult to capture the far-distance interaction in space or time, and the prediction results may deviate from the actual security area, which will not provide effective guidance for the decision control task of intelligent vehicles.

SUMMARY

The present application provides a prediction-type intelligent vehicle decision control method and apparatus, vehicle and storage medium, so as to solve the problem that the prediction result in the "prediction-decision control" open-loop solution in the related art lacks effective guidance for the decision control process, and a prediction-type optimal strategy solution for an intelligent vehicle is achieved through an iterative model-driven self-evolution strategy evaluation and strategy promotion process.

An embodiment of a first aspect of the present application provides a prediction-type intelligent vehicle decision control method, which includes the following steps:

establishing a prediction model for surrounding traffic participants based on map information and historical tracks of the traffic participants, and performing parameter initialization on the prediction model by using a labeled data set to generate an initial surrounding vehicle motion prediction model;

cyclically updating the initial surrounding vehicle motion prediction model according to continuous interaction data with an environment by taking a driving target of an intelligent vehicle as an optimization object, so as to generate a final surrounding vehicle motion prediction model; and embedding the final surrounding vehicle motion prediction model into a decision control system of the intelligent vehicle, such that the decision control system generates a corresponding decision control instruction according to a surrounding vehicle motion predicted by the final surrounding vehicle motion prediction model, and controls the intelligent vehicle to execute the decision control instruction.

Optionally, the establishing the prediction model for surrounding traffic participants based on map information and historical tracks of the traffic participants, and performing parameter initialization on the prediction model by using the labeled data set to generate the initial surrounding vehicle motion prediction model includes:

vectorized encoding the map information and the historical tracks in the data set.

Optionally, the cyclically updating the initial surrounding vehicle motion prediction model according to continuous interaction data with an environment by taking a driving target of an intelligent vehicle as an optimization object, so as to generate a final surrounding vehicle motion prediction model includes:

performing graph neural network-based message-passing aggregation updating on input node features, and performing multi-axis information transmission based on an attention mechanism at a level of aggregated features to obtain new aggregated features; and decoding the new aggregated features, calculating a minimum quadratic error between an output intended prediction probability and a predicted track and true values in the data set, so as to obtain an objective function and a gradient for updating a prediction model, and performing back propagation update on parameters of the prediction model, so as to obtain the final surrounding vehicle motion prediction model.

Optionally, the decision control system generating a corresponding decision control instruction according to a surrounding vehicle motion predicted by the final surrounding vehicle motion prediction model includes:

forward recursively inferring, using the final surrounding vehicle motion prediction model, surrounding vehicle future finite step states within an ego vehicle sensing range, and calculating an uncertainty metric;

acquiring ego vehicle future finite step states based on the surrounding vehicle future finite step states and the uncertainty metric, obtaining a value function based on the decision control system, and calculating a corresponding updated objective function and a corresponding updated gradient; and while updating parameters of the decision control system according to the objective function and the gradient, obtaining an optimal control strategy, and generating the decision control instruction.

Optionally, the decision control system generating a corresponding decision control instruction according to a surrounding vehicle motion predicted by the final surrounding vehicle motion prediction model includes:

detecting whether the optimal control strategy satisfies a security threshold condition; and generating the decision control instruction if the security threshold condition is satisfied, otherwise forward recursively infer again a surrounding vehicle future finite step states within the ego vehicle sensing range, and calculating the uncertainty metric.

A second aspect of the present application provides a prediction-type intelligent vehicle decision control apparatus including:

a first generation module configured to establish a prediction model for surrounding traffic participants based on map information and historical tracks of the traffic participants, and perform parameter initialization on the prediction model by using a labeled data set to generate an initial surrounding vehicle motion prediction model;

a second generation module configured to cyclically update the initial surrounding vehicle motion prediction model according to continuous interaction data with an environment by taking a driving target of an intelligent vehicle as an optimization object, so as to generate a final surrounding vehicle motion prediction model; and a control module configured to embed the final surrounding vehicle motion prediction model into a decision control system of the intelligent vehicle, such that the decision control system generates a corresponding decision control instruction according to a surrounding vehicle motion predicted by the final surrounding vehicle motion prediction model, and controls the intelligent vehicle to execute the decision control instruction.

Optionally, the first generation module is specifically configured to:

vectorized encode the map information and the historical tracks in the data set.

Optionally, the second generation module is specifically configured to:

perform graph neural network-based message-passing aggregation updating on input node features, and perform multi-axis information transmission based on an attention mechanism at a level of aggregated features to obtain new aggregated features; and decode the new aggregated features, calculate a minimum quadratic error between an output intended prediction probability and a predicted track and true values in the data set, so as to obtain an objective function and a gradient for updating a prediction model, and perform back propagation update on parameters of the prediction model, so as to obtain the final surrounding vehicle motion prediction model.

Optionally, the control module is specifically configured to:

forward recursively infer, using the final surrounding vehicle motion prediction model, surrounding vehicle future finite step states within an ego vehicle sensing range, and calculate an uncertainty metric;

acquire ego vehicle future finite step states based on the surrounding vehicle future finite step states and the uncertainty metric, obtain a value function based on the decision control system, and calculate a corresponding updated objective function and a corresponding updated gradient; and while updating parameters of the decision control system according to the objective function and the gradient, obtain an optimal control strategy, and generate the decision control instruction.

Optionally, the control module is further configured to:

detect whether the optimal control strategy satisfies a security threshold condition; and generate the decision control instruction if the security threshold condition is satisfied, otherwise forward recursively infer again a surrounding vehicle future finite step states within the ego vehicle sensing range, and calculate the uncertainty metric.

A third aspect of the present application provides a vehicle including: a memory, a processor, and a computer program stored on the memory and executable on the processor, the processor executing the program to implement the prediction-type intelligent vehicle decision control method as described in the above embodiments.

An embodiment of a fourth aspect of the present application provides a computer-readable storage medium having stored thereon a computer program which is executed by a processor, for implementing the prediction-type intelligent vehicle decision control method according to the above embodiment.

Thus, by establishing an interpretable prediction model for the surrounding traffic participants, which can describe the uncertainty, and coupling it into the decision control process of the intelligent vehicle, the problem can be solved that the prediction result in the "prediction-decision control" open-loop solution in the related art lacks effective guidance for the decision control process, and a prediction-type optimal strategy solution for an intelligent vehicle is achieved through an iterative model-driven self-evolution strategy evaluation and strategy promotion process.

Additional aspects and advantages of the invention will be set forth in part in the description which follows and, in part, will be obvious from the description, or may be learned by practice of the invention.

BRIEF DESCRIPTION OF DRAWINGS

The above and/or additional aspects and advantages of the present application will become apparent and readily appreciated from the following description of embodiments taken in conjunction with the accompanying drawings of which.

DESCRIPTION OF EMBODIMENTS

Figure 1:
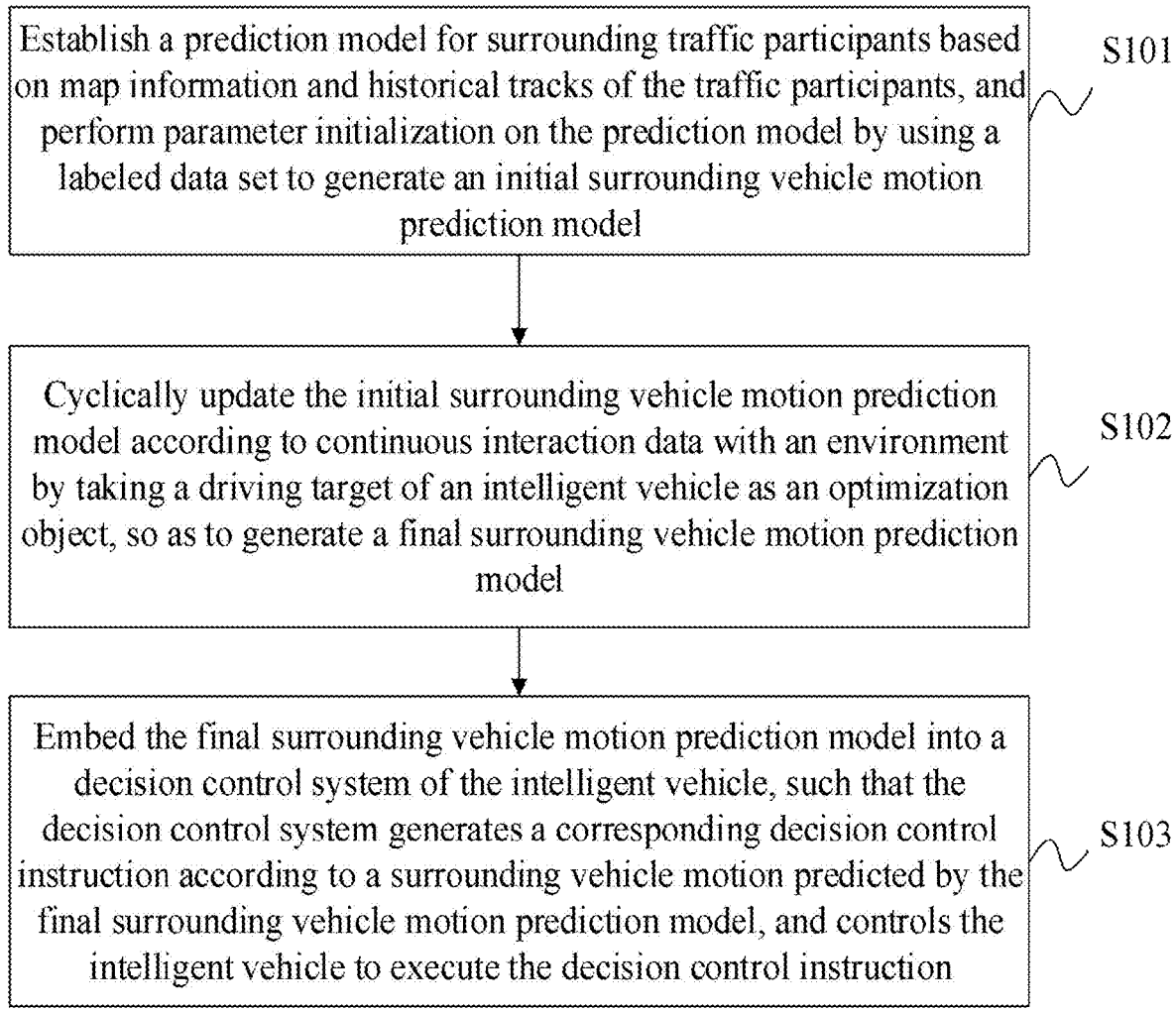
FIG. 1 is a flowchart of a prediction-type intelligent vehicle decision control method according to an embodiment of the present application.

Reference will now be made in detail to the embodiments of the present application, examples of which are illustrated in the accompanying drawings, wherein like reference numerals refer to the same or similar elements throughout the several views, and wherein like reference numerals refer to the same or similar elements throughout the several views. The embodiments described below referring to the FIGS. are exemplary and are intended to be illustrative of the present application and are not to be construed as limiting the present application.

A prediction-type intelligent vehicle decision control method and apparatus, vehicle, and storage medium according to an embodiment of the present application will be described below with reference to the accompanying drawings. In view of the problem that the prediction results in the "prediction-decision control" open-loop type solution mentioned in the above-mentioned background art lack effective guidance for the decision control process, the present application provides a prediction-type intelligent vehicle decision control method, by establishing an interpretable prediction model for the surrounding traffic participants, which can describe the uncertainty, and coupling it into the decision control process of the intelligent vehicle, the problem can be solved that the prediction result in the "prediction-decision control" open-loop solution in the related art lacks effective guidance for the decision control process, and a prediction-type optimal strategy solution for an intelligent vehicle is achieved through an iterative model-driven self-evolution strategy evaluation and strategy promotion process.

Specifically, FIG. 1 is a schematic flow diagram of a prediction-type intelligent vehicle decision control method according to an embodiment of the present application.

Figure 2:
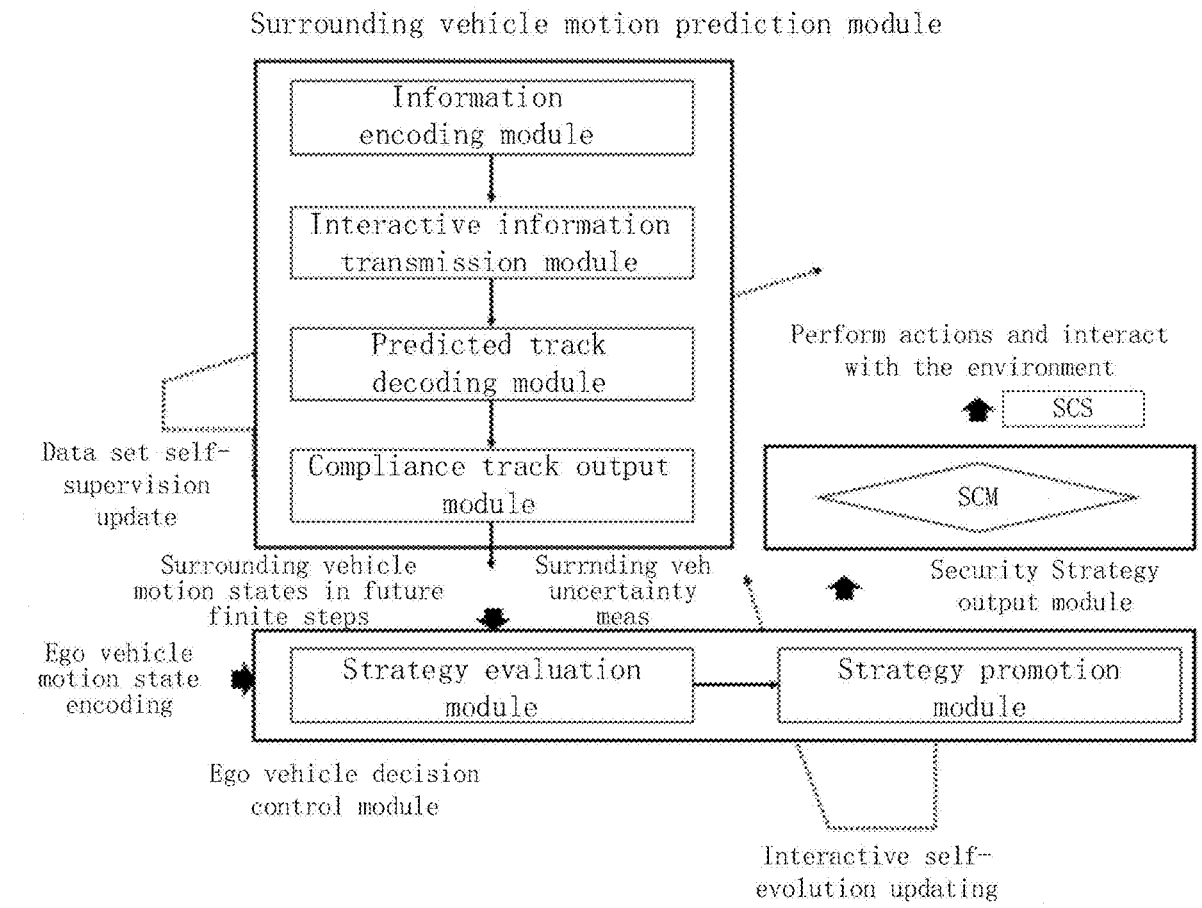
FIG. 2 is a block diagram of a prediction-type intelligent vehicle decision control method according to an embodiment of the present application.

In this embodiment, as shown in FIG. 2, the prediction-type intelligent vehicle decision control process includes at least three functional modules, namely, a surrounding vehicle motion prediction module, an ego vehicle decision control module and a security strategy output module, wherein the surrounding vehicle motion prediction module is initialized on a pre-defined data set, and is then accessed to the ego vehicle decision control module and the security strategy output module configured to cascade update and application.

Figure 3:
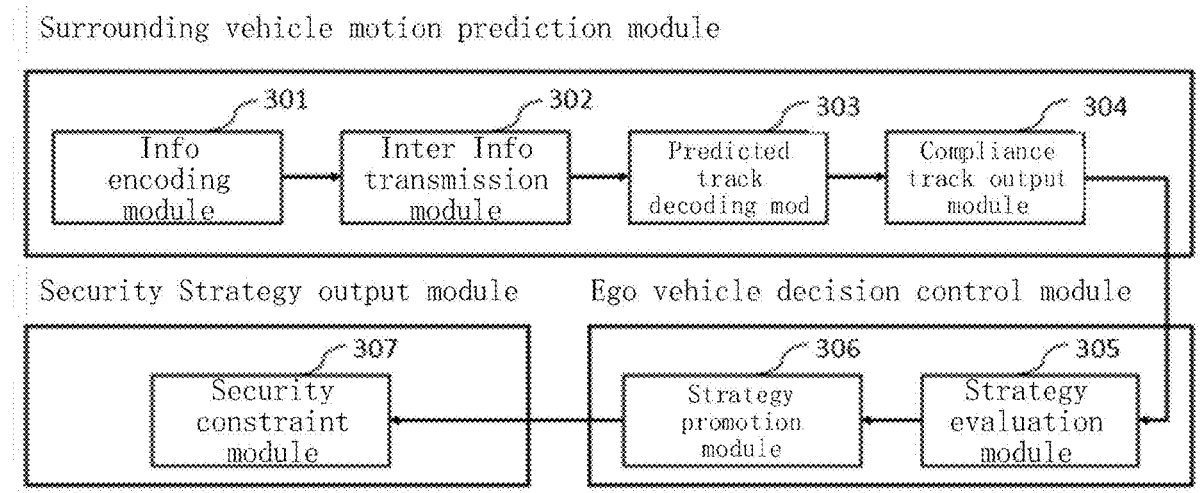
FIG. 3 is a schematic diagram of a prediction-type intelligent vehicle decision control apparatus according to an embodiment of the present application.

A surrounding vehicle motion prediction module and a method for coupling same with a control strategy are the cores of the present embodiment, and as shown in FIG. 3, the surrounding vehicle motion prediction module includes an information encoding module 301, an interactive information transmission module 302, a predicted track decoding module 303 and a compliance track output module 304, wherein the information encoding module 301 is used for vectorization encoding of map information and historical track information about surrounding traffic participants; the interactive information transmission module 302 is used for performing multi-axis information transmission, aggregation and update on a node aggregated feature of vectorized information; the predicted track decoding module 303 is used for recurring the motion trend of the surrounding traffic participants in the sensing range, and outputting the uncertainty metric and inputting same to the decision control module; the compliance track output module 304 is used to filter and ensure that the prediction module outputs a compliance track that is meaningful to downstream decision control tasks. An ego vehicle decision control module includes a strategy evaluation module 305 and a strategy promotion module 306, wherein the strategy evaluation module 305 is used for evaluating a value function of a current strategy and calculating an objective function of strategy updating; the strategy promotion module 306 is used for calculating the gradient of the current cost function and strategy update direction, back-propagate and iteratively update the model parameters. The integrity strategy output module includes a security constraint module 307 used for checking the action information corresponding to an output strategy to ensure the security of executing the action. Specifically, a fully-connected neural network is used for encoding the vectored map information and the historical tracks of surrounding traffic participants, and a message passing mechanism and an attention mechanism are used for extracting the features in three dimensions of time, space and interaction logic, and a predicted track and an intention probability with explicit physical meaning are obtained with the target of an actual map sampling slice. The latter uses the output of the prediction module as the approximation of the state in the future finite time step in the strategy evaluation and strategy promotion module to accelerate a convergence speed of the optimal strategy, and at the same time, the control effect is improved by embedding the explicit uncertainty measure. Finally, the security Strategy output module is configured to check the security of the Strategy and realize the security interaction with the environment.

Specifically, as shown in FIG. 1, the prediction-type intelligent vehicle decision control method includes the following steps:

step S101: establishing a prediction model for surrounding traffic participants based on map information and historical tracks of the traffic participants, and performing parameter initialization on the prediction model by using a labeled data set to generate an initial surrounding vehicle motion prediction model.

Optionally, in some embodiments, the establishing the prediction model for surrounding traffic participants based on map information and historical tracks of the traffic participants, and performing parameter initialization on the prediction model by using the labeled data set to generate the initial surrounding vehicle motion prediction model includes performing vectorization encoding on map information and historical tracks in the data set.

It should be appreciated that in generating an initial surrounding vehicle motion prediction model, embodiments of the present application may initialize the four sub-module model parameters of the surrounding vehicle motion prediction model, vectorization encoding the static map information in the data set and the historical tracks of the dynamic traffic participants to start the prediction model initialization, and the specific process will be described in detail later.

Step S102: cyclically update the initial surrounding vehicle motion prediction model according to continuous interaction data with an environment by taking a driving target of an intelligent vehicle as an optimization object, so as to generate a final surrounding vehicle motion prediction model.

Optionally, in some embodiments, with the driving target of the intelligent vehicle as an optimization object, the initial surrounding vehicle motion prediction model is cyclically updated according to the continuous interaction data with the environment to generate a final surrounding vehicle motion prediction model, which includes: input node features are performed graph neural network-based message-passing aggregation updating, and multi-axis information transmission is performed based on an attention mechanism at a level of aggregated features to obtain new aggregated features; the new aggregated features are decoded, and the objective function and gradient of the updated prediction model are obtained by calculating the minimum quadratic error of the output intended prediction probability and the predicted track and the true values in the data set, and the final surrounding vehicle motion prediction model is obtained by back-propagation updating of the parameters of the prediction model.

Specifically, according to an embodiment of the present application, the node features of input information can be performed graph neural network-based message-passing aggregation updating, and a level of aggregated features are performed attention mechanism based on multi-axis information transmission on to obtain new aggregated features for prediction-type decoding; the above-mentioned aggregated features are decoded, the output intended prediction probability and the predicted track and the true values in the data set are performed a minimum quadratic error calculation to obtain an objective function and a gradient for updating the prediction model, a back propagation update is performed on the parameters of the prediction model, and the initialization of the prediction model is completed to obtain a final surrounding vehicle motion prediction model.

Step S103: embedding the final surrounding vehicle motion prediction model into a decision control system of the intelligent vehicle, such that the decision control system generates a corresponding decision control instruction according to a surrounding vehicle motion predicted by the final surrounding vehicle motion prediction model, and controls the intelligent vehicle to execute the decision control instruction.

Optionally, in some embodiments, the decision control system generates a corresponding decision control instruction according to a surrounding vehicle motion predicted by the final surrounding vehicle motion prediction model, and controls the intelligent vehicle to execute the decision control instruction includes: by using the forward recursion of the final surrounding vehicle motion prediction model, the surrounding vehicle future finite step state in the ego vehicle sensing range is obtained, and a uncertainty metric is calculated; a surrounding vehicle future finite step state is obtained according to the surrounding vehicle future finite step states and the uncertainty metric, and the value function is obtained based on the decision control system, and the corresponding updated objective function and a corresponding updated gradient are calculated; the parameters of the decision control system are updated according to the objective function and gradient, the optimal control strategy is obtained and the decision control instruction is generated.

Specifically, according to an embodiment of the present application, the final surrounding vehicle motion prediction model obtained in the above-mentioned step S102 can be embedded into the decision control system, the surrounding traffic participants future finite step state in the ego vehicle sensing range is recursively deduced using the prediction model, and an uncertainty metric is calculated, and the above-mentioned obtained surrounding traffic participants future finite step state, the uncertainty metric and the ego vehicle future finite step state recursively deduced from the ego vehicle prior model are input into the strategy evaluation module and the strategy promotion module of the decision control system through fully-connected operator encoding; the model recursive state is used for approximating the value function of the strategy evaluation, and the objective function and gradient updated by the corresponding module are calculated, and the gradient information obtained by the above-mentioned calculation is combined to update the parameters of the strategy evaluation module, the parameters of the strategy promotion module and the parameters of the prediction model, and the optimal control strategy is obtained through cyclic iteration.

Optionally, in some embodiments, the decision control system generates a corresponding decision control instruction according to a surrounding vehicle motion predicted by the final surrounding vehicle motion prediction model, and controls the intelligent vehicle to execute the decision control instruction further includes: whether an optimal control strategy satisfies a security threshold condition is detected; if the security threshold condition is satisfied, then a decision control instruction is generated, otherwise, the surrounding vehicle future finite step states within the ego vehicle sensing range is recursed forward, and an uncertainty metric is calculated.

It should be appreciated that embodiments of the present application can detect whether the above-mentioned optimal control strategy violates a Security threshold requirement in a Security constraint module, and if not, a threshold value of a corresponding action in a Security strategy set is output, otherwise, it is interacted with the environment, re-recur the surrounding vehicle future finite step state within an ego vehicle sensing range, and an uncertainty metric is calculated.

It can be seen therefrom that according to an embodiment of the present application, a prediction model is initialized on a data set and then deployed into a "prediction-decision control" closed loop framework for synchronous iteration, update and application, which is not limited to a scenario and has a strong scalability. That is to say, according to an embodiment of the present application, an interpretable prediction model is established for the uncertainty of traffic participants from three key dimensions of time, space and interaction relationship, and cascaded with the decision control process, and a "prediction-decision control" closed-loop solution is proposed, so as to realize the prediction-type intelligent vehicle decision control.

To further enable a person skilled in the art to understand the prediction-type intelligent vehicle decision control method of the embodiments of the present application, the following detailed description is provided in connection with specific embodiments.

Figure 4:
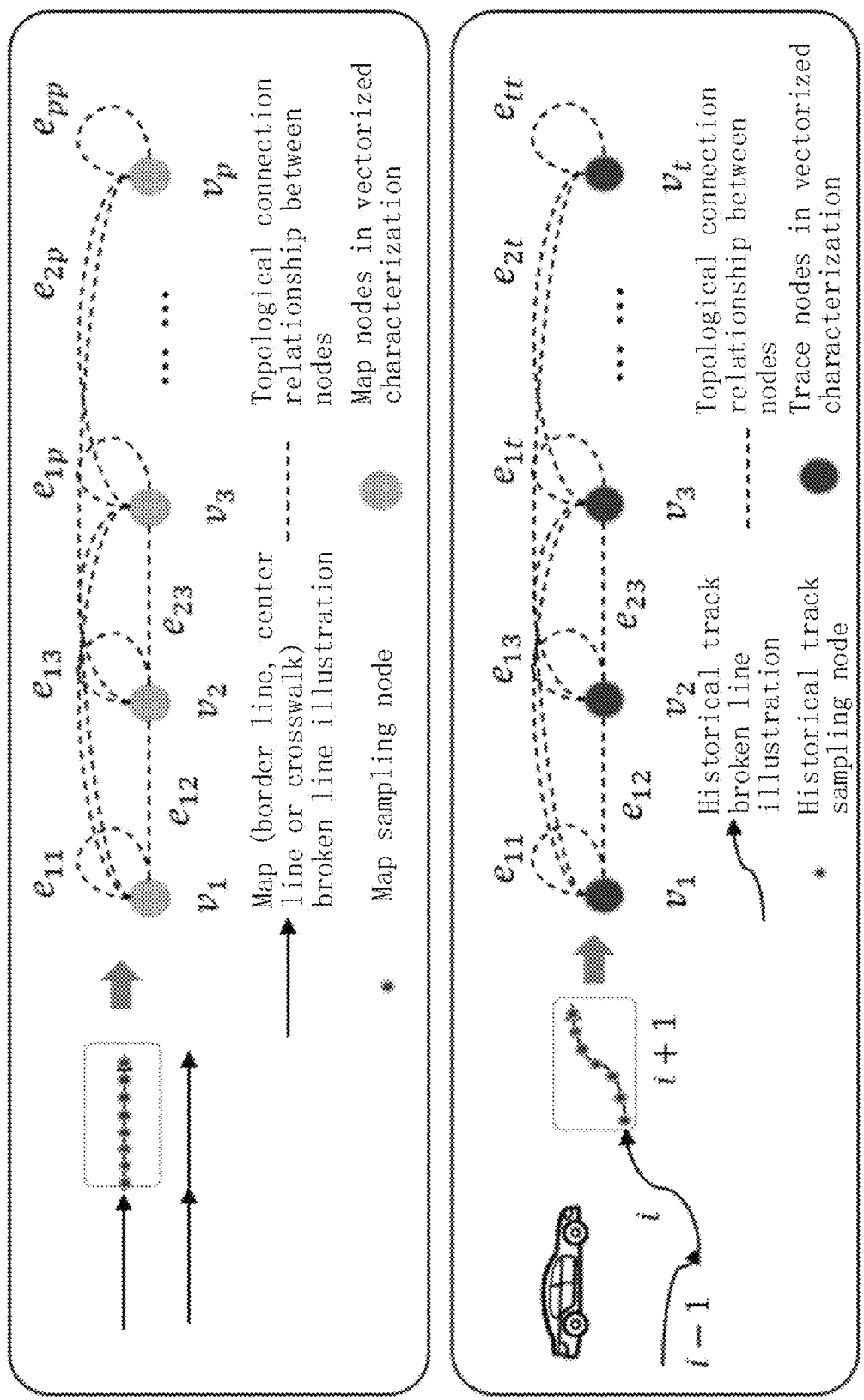
FIG. 4 is a schematic representation of vectorized information characterization according to an embodiment of the present application.

Specifically, in the initialization stage of the surrounding vehicle motion prediction module, firstly, the static map information (including a road boundary line, a lane center line and a crosswalk) and the historical track of a dynamic traffic participant are vectorization coded in the information encoding module, and as shown in FIG. 4, the information vectorization process of the module includes two parts: a boundary line, a center line or a crosswalk is divided into N polyline segments formed by p sampling nodes and their feature vectors, $v_i$, $i \in [1, p]$, $p \leq 10$, and a topological relationship between nodes, $e_{i,j}$, $i,j \in [1, p]$, $p \leq 10$, equidistantly, and a history track is divided into polyline segments formed by t sampling nodes and their feature vectors, $v_i$, $i \in [1, t]$, $t \leq 10$, and a topological relationship between nodes, $e_{ij}$, $i, j \in [1, t]$, $t \leq 10$, at constant durations. The physical meaning of each $v_i$ is information about a polyline segment with a fixed precision, which includes 8-dimensional information:

$$v_i=[x^r,y^r,\vec{x}^r,\vec{y}^r,id^r,\delta^r,\text{flag}^r,\text{type}^r], i \in [1,p], p \leq 10; \quad (1)$$

$$v_i=[x^a,y^a,v_x^a,v_y^a,\omega^a,d^a,\text{ang}^a,\text{type}^a], i \in [1,t], t \leq 10;$$

r represents a mark of a road, a represents a mark of a traffic participant, x', y', v'$_x$, v'$_y$, type' respectively represents a transverse and longitudinal coordinate of a marked object, a transverse and longitudinal speed and a type (a vehicle, a road boundary, a center line or a crosswalk), $\vec{x}^r$, $\vec{y}^r$ respectively represents a transverse and longitudinal unit direction vector of the mark road, id$^r$ represents a road id, $\delta^r$ represents an angle of a road point relative to a normalized coordinate, flag$^r$ represents whether the road is valid, $\omega^a$ represents a yaw rate, $d^a$ represents a width of the marked object, and ang$^a$ represents a direction angle of the marked object.

Figure 5:
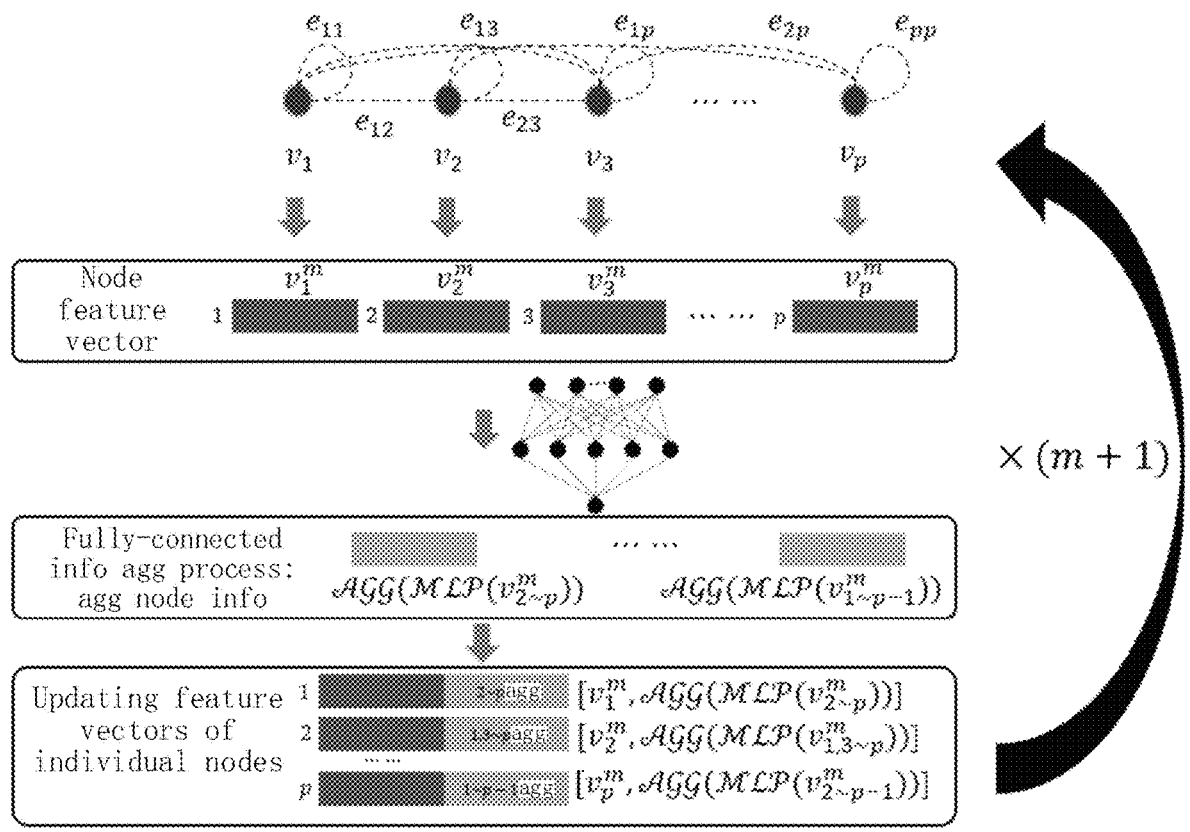
FIG. 5 is a diagram illustrating aggregation of node information according to an embodiment of the present application.

Using a message passing mechanism of a graph neural network, according to the topological connection relationship in FIG. 4, each node is performed (m+1) times information aggregation and update via a fully-connected operator and a ranking invariant operator, and as shown in FIG. 5, updated node information is obtained, $v_i^{m+1}=[v_i^m, \mathcal{AGG}(\mathcal{MLP}(v_{\backslash i}^m))]$, wherein $\mathcal{AGG}(\bullet)$ represents a ranking invariant operator, $\mathcal{MLP}(\bullet)$ represents a fully-connected operator, m represents an update count, i represents a node sequence number, \i represents other nodes except the i$^{th}$ node, and $v_i^m$ is a feature vector of the i$^{th}$ node corresponding to the update times.

After completing the aggregation update of the input information, the output of the information encoding module is obtained; map aggregated feature $\mathcal{R}$ and traffic participant aggregated feature $\mathcal{A}$.

Figure 6:
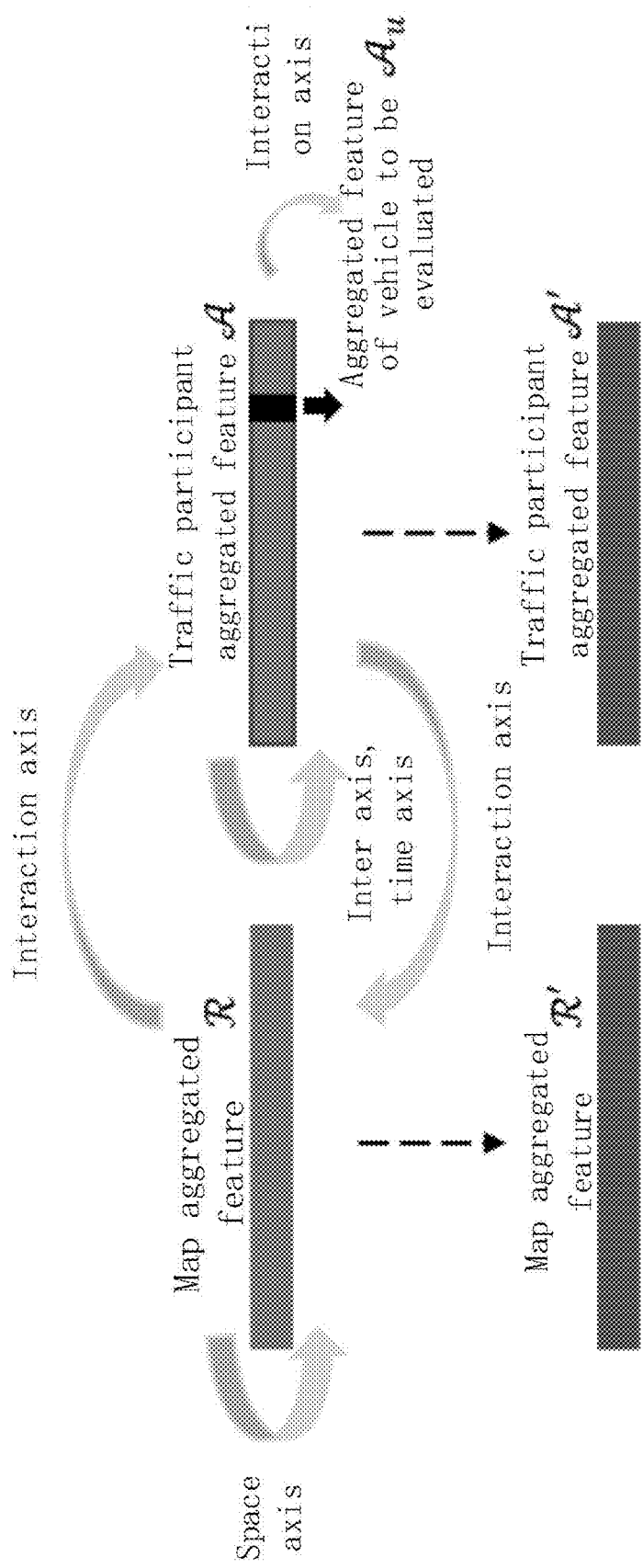
FIG. 6 is a diagram of multi-axis information transmission according to an embodiment of the present application.

Further, the map aggregated feature $\mathcal{R}$ output by the information encoding module and the traffic participant aggregated feature $\mathcal{A}$ are input into the interactive information transmission module, and multi-axis message transmission of a time axis, a space axis and an interaction axis is realized through an attention mechanism at the aggregated feature layer, as shown in FIG. 6. The interaction axis expresses the relationship between the main body of the road and the main body of the traffic participant, the time axis represents the deduction of the historical track level of the traffic participant, and the space axis represents the relationship between the main body of the road. New map aggregated feature $\mathcal{R}'$ is obtained by calculation:

$$\mathcal{R}_{tmp} = \sigma\left(\frac{Q_\mathcal{R} K_\mathcal{R}^T}{\sqrt{d_k}}\right) V_\mathcal{R}; \quad (2)$$

$$\mathcal{R}' = \sigma\left(\frac{Q_{\mathcal{R}_{tmp}} K_\mathcal{A}^T}{\sqrt{d_k}}\right) V_\mathcal{A};$$

the aggregated feature $\mathcal{A}'$ with the traffic participant:

$$\mathcal{A}_{tmp,1} = \sigma\left(\frac{Q_\mathcal{A} K_\mathcal{A}^T}{\sqrt{d_k}}\right) V_\mathcal{A}; \quad (3)$$

$$\mathcal{A}_{tmp,2} = \sigma\left(\frac{Q_{\mathcal{A}_{tmp,1}} K_{\mathcal{A}_u}^T}{\sqrt{d_k}}\right) V_{\mathcal{A}_u};$$

$$\mathcal{A}' = \sigma\left(\frac{Q_{\mathcal{A}_{tmp,2}} K_\mathcal{R}^T}{\sqrt{d_k}}\right) V_\mathcal{R};$$

$Q(\bullet)$, $K(\bullet)$, $V(\bullet)$ represents a fully-connected operator, $\sigma(\bullet)$ represents a maximization operator, and $d_k$ represents the dimension of a query matrix Q.

Figure 7:
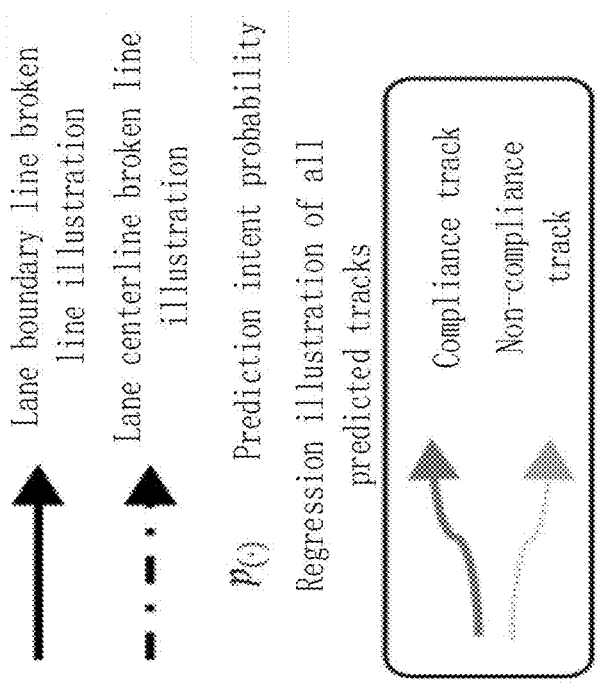
FIG. 7 is a diagram of motion prediction results according to an embodiment of the present application.
Figure 7:
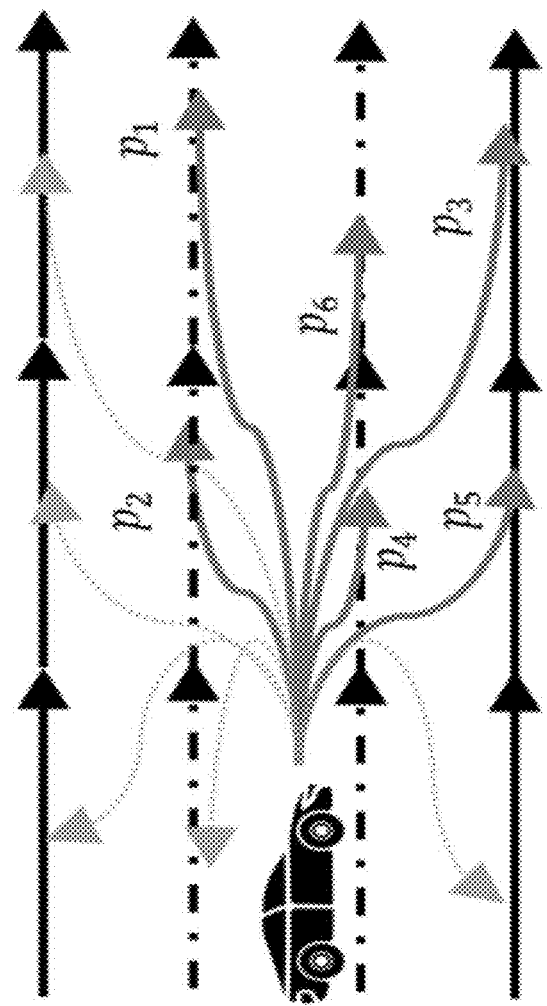

Further, the map aggregated feature $\mathcal{R}'$ and the traffic participant aggregated feature $\mathcal{A}'$ output by the interactive information transmission module are input into the predicted track decoding module to predict an intention and a regression track of M vehicles to be estimated. As shown in FIG. 7, the intention prediction result in the present embodiment corresponds to a slice of map sampling information, and can be adaptively adjusted according to prediction accuracy requirements, wherein:

$$I_{\mathcal{A}_u} = \mathcal{MLP}_I([\mathcal{A}_u', \mathcal{R}']); \quad (4)$$

$$Reg_{\mathcal{A}_u} = \mathcal{MLP}_{Reg}([\mathcal{A}_u', \mathcal{R}']);$$

$I_{\mathcal{A}_u}: [p_1, \ldots, p_N]$ represents the probability result of the intention prediction, and the dimension is [N, 1], the physical meaning is a possible position to which the vehicle to be estimated may arrive in the future, corresponding to an initially encoded road boundary, center line or slice polyline segment of a pedestrian crossing, and the road position is used for explicitly expressing the movement intention of the vehicle to be estimated in the future. Re $g_{\mathcal{A}_u}$ represents the regression prediction result, the dimension is [M, 2*Z], M represents the number of vehicles to be estimated, Z represents the motion prediction duration in unit of seconds (s), and the dimension 2 represents the coordinate information, (x, y). $\mathcal{MLP}(\bullet)$ is a fully-connected operator, $\mathcal{A}_u'$ represents a new aggregated feature of the vehicle to be evaluated.

Further, the intention prediction results $I_{\mathcal{A}_u}$ and the regression prediction results Re $g_{\mathcal{A}_u}$ of the M vehicles to be estimated output by the predicted track decoding module are input into the compliance track output module, the differences between the prediction outputs of all the vehicles to be estimated and the true values thereof with labels are calculated to obtain the objective function $\mathcal{L}$ for updating the feed-forward network;

$$\mathcal{L}(\theta) = \mathcal{L}_I + \mathcal{L}_{Reg}; \quad (5)$$

$$\mathcal{L}_I = MSE(I_{\mathcal{A}_u} - \text{onehot}(\mathbb{I}_{I,gt}));$$

$$\mathcal{L}_{Reg} = MSE(Re\, g_{\mathcal{A}_u} - Re\, g_{\mathcal{A}_u,gt});$$

$\mathcal{L}_I$ and $\mathcal{L}_{Reg}$ are respectively objective functions of an intention prediction and a regression prediction result, $\mathbb{I}_{I,gt}$ represents a {0,1} mark of a broken line section of a map where a true value of a future track of a vehicle to be estimated is located, onehot($\bullet$) is a one-hot encoding operator, and Re $g_{\mathcal{A}_u,gt}$ represents a real track point of the vehicle to be estimated in a data set. $\theta$ represents the set of network parameters and is updated by the gradient of the objective function $\mathcal{L}$:

$$\theta_{k+1} \leftarrow \theta_k + \alpha \nabla \mathcal{L}(\theta); \quad (6)$$

Figure 8:
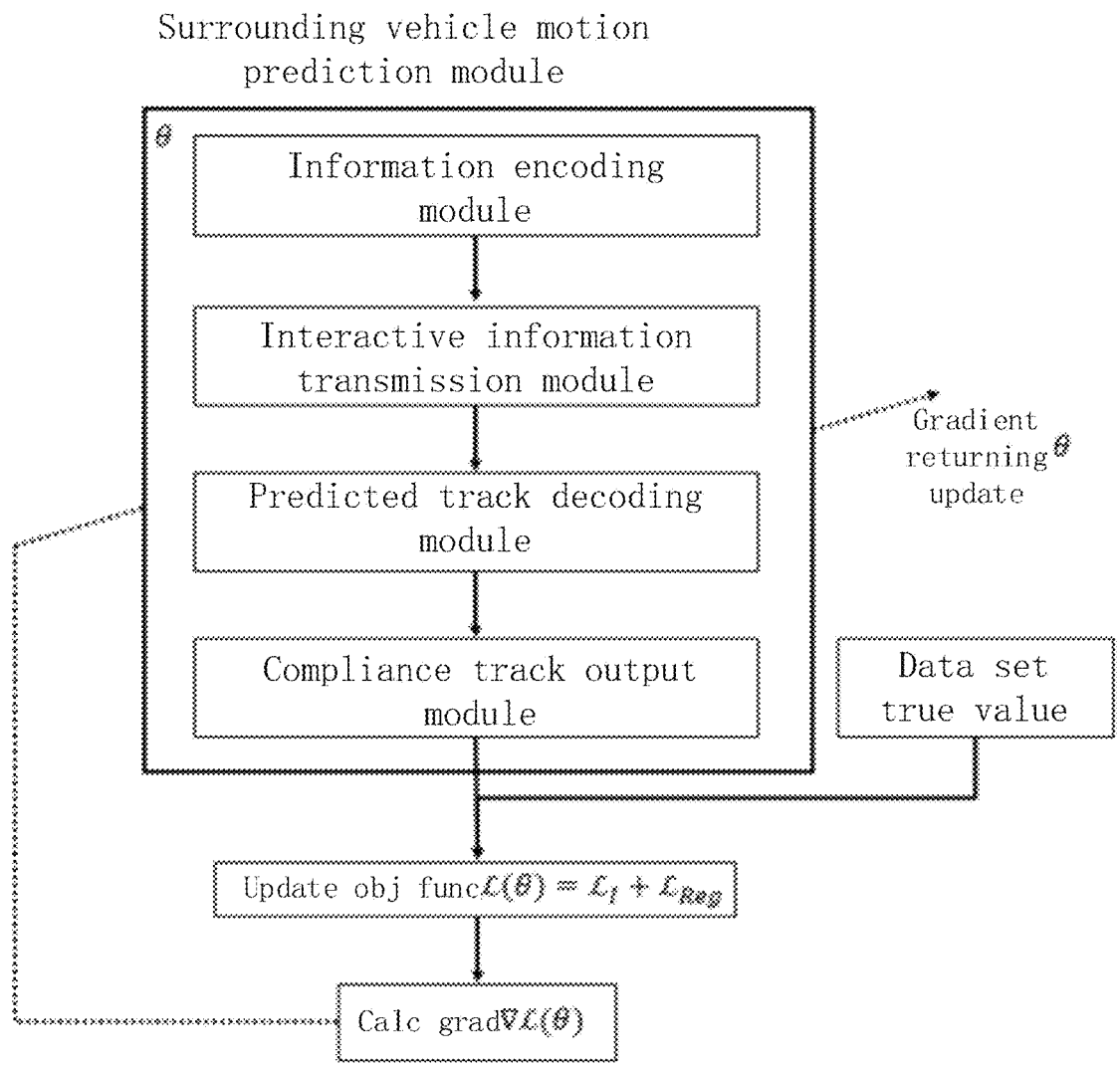
FIG. 8 is a schematic diagram of a surrounding vehicle motion prediction module parameter updating according to an embodiment of the present application.

$\alpha$ is an updated step size, $\theta_{k+1}$ represents the network operator parameter updated for the k+1$^{th}$ time. This is shown in FIG. 8.

Then, the first six prediction results with the highest probability are selected according to the probability output of the intention prediction, and the prediction probability $l_{\mathcal{A}_{u,top_6}}$ and the corresponding prediction regression track $\text{Re } g_{\mathcal{A}_{u,top_6}}$ are obtained as shown in FIG. 7. The above module performs training on the pre-collected data set to obtain the optimal network parameter θ* as the initialized initial parameter of the surrounding vehicle motion prediction module.

Figure 9:
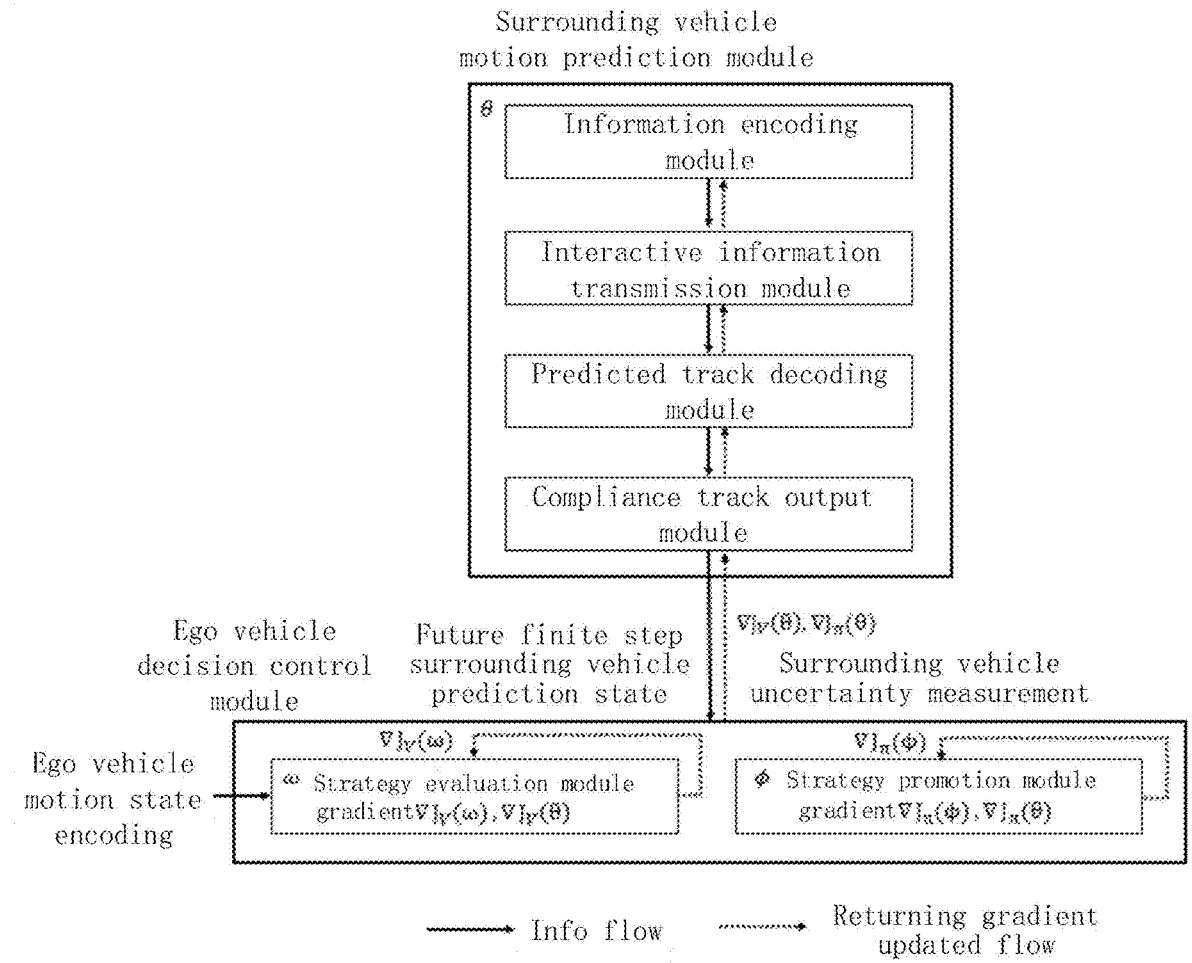
FIG. 9 is a schematic diagram of a coupled "prediction-decision control" update according to an embodiment of the present application.

Further, the "prediction-decision control" process is coupled in cascade, and a future finite step surrounding vehicle prediction state $S_{sur}$ output by the surrounding vehicle motion prediction module, a surrounding vehicle uncertainty metric $\mathcal{U}_{sur}$ and an ego vehicle motion state code $S_{self}$ are input into the ego vehicle decision control module, wherein the future finite step surrounding vehicle prediction state is a maximum probability prediction regression track of a traffic participant in a sensing range, $\text{Re } g_{\mathcal{A}_{u,i,top_1}}$, as shown in FIG. 9, and $\mathcal{A}_{u,i}$ represents a vehicle to be estimated in a $i^{th}$ sensing range. The surrounding vehicle uncertainty measurement is the predicted probability variance for each vehicle to be evaluated:

$$\mathcal{U}_i = \text{Var}(l_{\mathcal{A}_{u,i,top_6}}); \tag{7}$$

Further, a state quantity code of the current time is calculated:

$$s_t = \sigma(\mathcal{MLP}(S_{sur,t}), \mathcal{MLP}(S_{self,t}), \mathcal{MLP}(\Sigma_i(\mathcal{U}_{sur,t,i}))); \tag{8}$$

$\mathcal{MLP}(\bullet)$ is a fully-connected operator, and $\sigma(\bullet)$ is an order-invariant additive operator.

Further, the parameter of the initialized Strategy evaluation network V is ω, and the parameter of the Strategy network π is φ. According to the ego vehicle prior two-degree-of-freedom dynamic model $f_{self}$ and the surrounding vehicle motion prediction model $f_\theta$, the predicted states of surrounding vehicles in the next p finite steps are recursively deduced, and the objective function of the strategy evaluation network V is calculated:

$$\min_{\omega} J_V(\omega) = \mathbb{E}_{s_t \sim f_\theta, f_{self}} \left[ \frac{1}{2} \left( V_\omega(s_t; \omega) - \sum_{i=1}^{p} V_{\bar{\omega}}(s_i) \right)^2 \right]; \tag{9}$$

$\bar{\omega}$ is a parameter of a target Strategy evaluation network, and the synchronization update is performed through a parameter ω of a Strategy evaluation network V every k steps.

Further, an objective function of the Strategy network π is computed:

$$\max_{\pi_\theta} J_\pi(\theta) = l(x, \pi_\theta) + V_{\bar{\omega}}(s_{t+1}); \tag{10}$$

$l(x, \pi_\theta)$ is an optimization objective of the intelligent vehicle decision control process, including stability, energy saving and tracking, and the optimization objective can be designed according to the requirements of different tasks.

Further, gradient is solved for the objective functions in (9) and (10):

$$\nabla J_V(\omega) = \mathbb{E}_{s_t \sim f_\theta, f_{self}} \left[ \left( V_\omega(s_t; \omega) - \sum_{i=1}^{p} V_{\bar{\omega}}(s_i) \right) \frac{\partial V_\omega(s_t; \omega)}{\partial \omega} \right]; \tag{11}$$

$$\nabla J_\pi(\phi) = \left[ \left( \frac{\partial l(s_t, \pi_\phi)}{\partial \pi_\phi} + V_{\bar{\omega}}(s_{t+1}) \right) \frac{\partial \pi_\theta(\cdot \mid s_t; \phi)}{\partial \phi} \right]; \tag{12}$$

Further, the parameters ω of the Strategy evaluation network V and the parameters φ of the Strategy network π are updated:

$$\omega^{k+1} \leftarrow \omega^k - \alpha \nabla J_V(\omega); \tag{13}$$

$$\phi^{k+1} \leftarrow \phi^k - \beta \nabla J_\pi(\phi); \tag{14}$$

Further, the surrounding vehicle prediction model is adjusted and updated in real time according to the interactive objective function gradient:

$$\nabla J_V \theta(\omega) = \mathbb{E}_{s_t \sim f_\theta, f_{self}} \left[ \left( V_\omega(s_t; \omega) - \sum_{i=1}^{p} V_{\bar{\omega}}(s_i) \right) \frac{\partial V_\omega(s_t; \omega)}{\partial s_t} \frac{\partial s_t(\theta)}{\partial \theta} \right]; \tag{15}$$

$$\nabla J_\pi(\theta) = \left[ \left( \frac{\partial l(s_t, \pi_\phi)}{\partial s_t} + V_{\bar{\omega}}(s_{t+1}) \right) \frac{\partial s_t(\theta)}{\partial \theta} \right]; \tag{16}$$

$$\theta^{k+1} \leftarrow \theta^k - \gamma(\nabla J_V(\theta) + \nabla J_\pi(\theta)); \tag{17}$$

α, β and γ are gradient updated step sizes.

Further, the network parameters described above are iteratively updated to output an optimal control strategy $\pi_t^*$, wherein the optimal control strategy $\pi_t^*$ includes a steering wheel angle $\delta_t$ and vehicle acceleration $a_t$. Further, the Strategy is checked security in a security constraint module:

$$a_{safe} = \begin{cases} \pi_t^*(s_t), & \pi_t^*(s_t) \in \mathcal{U}_{safe} \\ \overline{\pi_t^*(s_t)} \mathcal{U}_{safe}, & \pi_t^*(s_t) \notin \mathcal{U}_{safe} \end{cases}; \tag{18}$$

$\mathcal{U}_{safe}$ is a secure action set in an action space. If the Strategy output is not in the secure set, the security control Strategy selects its projection within the secure action set, i.e.

$$\overline{\pi_t^*(s_t)} \mathcal{U}_{safe}.$$

$a_{safe}$ is a security control strategy output by an intelligent vehicle decision control module finally, which interacts with the environment.

In summary, the prediction-type intelligent vehicle decision control method according to the embodiment of the present application has the following advantages:
(1) a closed-loop updating framework of prediction-type decision control is established by explicitly embedding the recursive result and uncertainty measurement of the prediction-type model on the future motion state of the surrounding vehicle into the strategy promotion and strategy evaluation process of the decision control module;
(2) a prediction model which can describe the uncertainty of motion trend is established, and an interpretable prediction model based on vector vectorized encoding information is established, which can effectively serve the downstream decision control tasks;
(3) according to the requirements of different tasks, the accuracy of the prediction model can be adjusted, the optimization objectives of decision control strategy can be adjusted, and the performance of the intelligent vehicle decision control system can be improved by making full use of prediction intelligence.

According to the prediction-type intelligent vehicle decision control method proposed in the embodiment of the present application, by establishing an interpretable prediction model for the surrounding traffic participants, which can describe the uncertainty, and coupling it into the decision control process of the intelligent vehicle, the problem can be solved that the prediction result in the "prediction-decision control" open-loop solution in the related art lacks effective guidance for the decision control process, and a prediction-type optimal strategy solution for an intelligent vehicle is achieved through an iterative model-driven self-evolution strategy evaluation and strategy promotion process.

Next, a prediction-type intelligent vehicle decision control apparatus according to an embodiment of the present application will be described with reference to the accompanying drawings.

Figure 10:
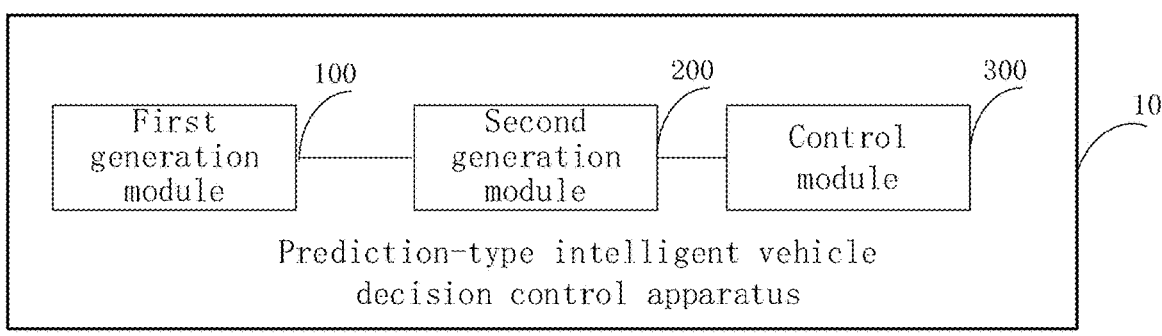
FIG. 10 is an exemplary diagram of a prediction-type intelligent vehicle decision control apparatus according to an embodiment of the present application.

FIG. 10 is a block schematic diagram of a prediction-type intelligent vehicle decision control apparatus according to an embodiment of the present application.

As shown in FIG. 10, the prediction-type intelligent vehicle decision control apparatus 10 includes: a first generation module 100, a second generation module 200 and a control module 300.

The first generation module 100 is configured to establish a prediction model for surrounding traffic participants based on map information and historical tracks of the traffic participants, and perform parameter initialization on the prediction model by using a labeled data set to generate an initial surrounding vehicle motion prediction model;

the second generation module 200 is configured to cyclically update the initial surrounding vehicle motion prediction model according to continuous interaction data with an environment by taking a driving target of an intelligent vehicle as an optimization object so as to generate a final surrounding vehicle motion prediction model; and the control module 300 is configured to embed the final surrounding vehicle motion prediction model into a decision control system of the intelligent vehicle, such that the decision control system generates a corresponding decision control instruction according to a surrounding vehicle motion predicted by the final surrounding vehicle motion prediction model, and controls the intelligent vehicle to execute the decision control instruction.

Optionally, the first generation module 100 is specifically configured to:

vectorized encode the map information and the historical tracks in the data set.

Optionally, the second generation module 200 is specifically configured to:

perform graph neural network-based message-passing aggregation updating on input node features, and performing multi-axis information transmission based on an attention mechanism at a level of aggregated features to obtain new aggregated features; and decode the new aggregated features, calculate a minimum quadratic error between an output intended prediction probability and a predicted track and true values in the data set, so as to obtain an objective function and a gradient for updating a prediction model, and perform back propagation update on parameters of the prediction model, so as to obtain the final surrounding vehicle motion prediction model.

Optionally, the control module 300 is specifically configured to:

forward recursively infer, using the final surrounding vehicle motion prediction model, surrounding vehicle future finite step states within an ego vehicle sensing range, and calculate an uncertainty metric;

acquire ego vehicle future finite step states based on the surrounding vehicle future finite step states and the uncertainty metric, obtain a value function based on the decision control system, and calculate a corresponding updated objective function and a corresponding updated gradient; and while updating parameters of the decision control system according to the objective function and the gradient, obtain an optimal control strategy, and generate the decision control instruction.

Optionally, the control module 300 is further configured to:

detect whether the optimal control strategy satisfies a security threshold condition; and generate the decision control instruction if the security threshold condition is satisfied, otherwise re-forward recursively infer a surrounding vehicle future finite step states within the ego vehicle sensing range, and calculate the uncertainty metric.

It should be noted that the foregoing explanation of the embodiment of the prediction-type intelligent vehicle decision control method is also applicable to the prediction-type intelligent vehicle decision control apparatus of the embodiment, and will not be repeated here.

According to the prediction-type intelligent vehicle decision control apparatus proposed in the embodiment of the present application, by establishing an interpretable prediction model for the surrounding traffic participants, which can describe the uncertainty, and coupling it into the decision control process of the intelligent vehicle, the problem can be solved that the prediction result in the "prediction-decision control" open-loop solution in the related art lacks effective guidance for the decision control process, and a prediction-type optimal strategy solution for an intelligent vehicle is achieved through an iterative model-driven self-evolution strategy evaluation and strategy promotion process.

Figure 11:
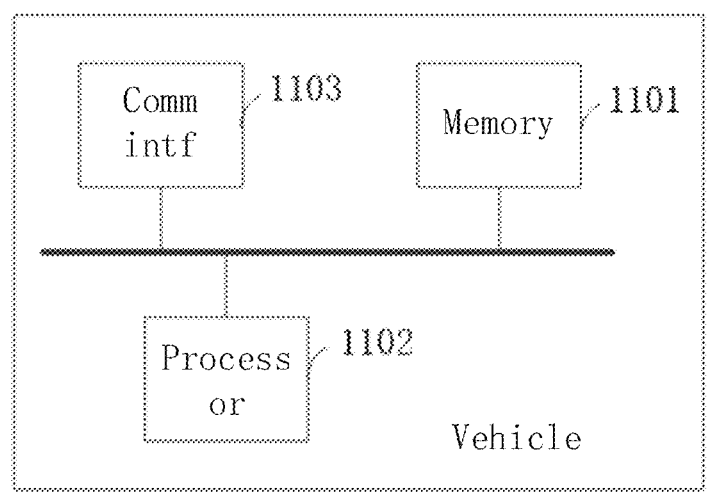
FIG. 11 is a schematic diagram of the structure of a vehicle according to an embodiment of the present application.

FIG. 11 is a schematic diagram of the structure of a vehicle according to an embodiment of the present application. The vehicle may include:

a memory 1101, a processor 1102 and a computer program stored on the memory 1101 and executable on the processor 1102.

The processor 1102, when executing the program, implements the prediction-type intelligent vehicle decision control method provided in the above embodiments.

Further, the vehicle further includes:

a communication interface 1103 for communication between the memory 1101 and the processor 1102.

The memory 1101 is used for storing a computer program executable on the processor 1102.

The memory 1101 may include high-speed RAM memory, and may also include non-volatile memory, such as at least one disk memory.

If the memory 1101, the processor 1102, and the communication interface 1103 are implemented separately, the communication interface 1103, the memory 1101, and the processor 1102 may be interconnected via a bus and communicate with each other. The bus may be an Industry Standard Architecture (ISA) bus, an Peripheral Component (PCI) bus, or an Extended Industry Standard Architecture (EISA) bus, etc. The bus may be divided into an address bus, a data bus, a control bus, etc. For ease of illustration, only one bold line is shown in FIG. 11, but does not indicate that there is only one bus or type of bus.

Optionally, if the memory 1101, the processor 1102, and the communication interface 1103 are implemented on a single chip, the memory 1101, the processor 1102, and the communication interface 1103 may communicate with each other via internal interfaces.

The processor 1102 may be a Central Processing Unit (CPU), or an Application Specific Integrated Circuit (ASIC), or one or more integrated circuits configured to implement embodiments of the present application.

Embodiments of the present application also provide a computer-readable storage medium having stored thereon a computer program that, when executed by a processor, implements the prediction-type intelligent vehicle decision control method as described above.

In the description of this specification, reference to the description of the terms "an embodiment", "some embodiments", "an example", "particular examples", or "some examples", etc., means that a particular feature, structure, material, or characteristic described in connection with the embodiment or example is included in at least an embodiment or example of the present application. In this description, schematic representations of the above terms are not necessarily directed to the same embodiment or example. Further, the particular features, structures, materials, or characteristics described may be combined in any one or N embodiments or examples in a suitable manner. Moreover, various embodiments or examples described in this specification, as well as features of various embodiments or examples, may be integrated and combined by a person skilled in the art without departing from the scope of the disclosure.

Further, the terms "first" and "second" are used for descriptive purposes only and are not to be construed as indicating or implying relative importance or implicitly indicating the number of technical features indicated. Thus, the features defined by "first" and "second" may explicitly or implicitly include at least one of the features. In the description herein, "N" means at least two, e.g. two, three, etc. unless specifically and specifically limited otherwise.

Any process or method descriptions in flow diagrams or otherwise described herein may be appreciated to represent modules, segments, or portions of code including one or N executable instructions for implementing the steps of a particular logical function or process, and the scope of the preferred embodiments of the present application includes additional implementations, which may not be in the order shown or discussed, including performing functions in a substantially simultaneous manner or in a reverse order according to the functions involved should be appreciated by a person skilled in the art to which the embodiments of the present application pertain.

It is to be appreciated that portions of the present application may be implemented in hardware, software, firmware, or a combination thereof. In the embodiments described above, N steps or methods may be implemented in software or firmware stored in memory and executed by a suitable instruction execution system. For example, if implemented in hardware, as in another embodiment, it may be implemented using any one or a combination of the following techniques known in the art: discrete logic circuits with logic gates for implementing logic functions on data signals, application specific integrated circuits with appropriate combinational logic gates, programmable gate arrays (PGAs), field programmable gate arrays (FPGAs), etc.

It will be appreciated by a person skilled in the art that all or a portion of the steps carried by a method of implementing the above-described embodiments may be performed by program instructions associated with hardware, which may be stored in a computer-readable storage medium, which when executed, includes one or a combination of the steps of the method embodiments.

What is claimed is:

1. A prediction-type intelligent vehicle decision control method, comprising:
   establishing a prediction model for surrounding traffic participants based on map information and historical tracks of the traffic participants, and performing parameter initialization on the prediction model by using a labeled data set to generate an initial surrounding vehicle motion prediction model;
   cyclically updating the initial surrounding vehicle motion prediction model according to continuous interaction data with an environment by taking a driving target of an intelligent vehicle as an optimization object, so as to generate a final surrounding vehicle motion prediction model; and
   embedding the final surrounding vehicle motion prediction model into a decision control system of the intelligent vehicle, such that the decision control system generates a corresponding decision control instruction according to a surrounding vehicle motion predicted by the final surrounding vehicle motion prediction model, and controls the intelligent vehicle to execute the decision control instruction;
   wherein the cyclically updating the initial surrounding vehicle motion prediction model according to continuous interaction data with the environment by taking the driving target of the intelligent vehicle as the optimization object so as to generate a final surrounding vehicle motion prediction model comprises:
   performing graph neural network-based message-passing aggregation updating on input node features, and performing multi-axis information transmission based on an attention mechanism at a level of aggregated features to obtain new aggregated features; and
   decoding the new aggregated features, calculating a minimum quadratic error between an output intended prediction probability and a predicted track and true values in the labeled data set, so as to obtain an objective function and a gradient for updating the prediction model, and performing back propagation updates on parameters of the prediction model, so as to obtain the final surrounding vehicle motion prediction model.

2. The method according to claim 1, wherein the establishing the prediction model for surrounding traffic participants based on map information and historical tracks of the traffic participants, and performing parameter initialization on the prediction model by using the labeled data set to generate the initial surrounding vehicle motion prediction model comprises:
   performing vectorized encoding on the map information and the historical tracks in the labeled data set.

3. The method according to claim 1, wherein the decision control system generating the corresponding decision control instruction according to the surrounding vehicle motion predicted by the final surrounding vehicle motion prediction model comprises:
   forward recursively inferring, using the final surrounding vehicle motion prediction model, surrounding vehicle future finite step states within an ego vehicle sensing range, and calculating an uncertainty metric;
   acquiring ego vehicle future finite step states based on the surrounding vehicle future finite step states and the uncertainty metric, obtaining a value function based on the decision control system, and calculating a corresponding updated objective function and a corresponding updated gradient; and while updating parameters of the decision control system according to the objective function and the gradient, obtaining an optimal control strategy, and generating the decision control instruction.

4. The method according to claim 3, wherein the decision control system generating the corresponding decision control instruction according to the surrounding vehicle motion predicted by the final surrounding vehicle motion prediction model further comprises:

detecting whether the optimal control strategy satisfies a security threshold condition; and generating the decision control instruction if the security threshold condition is satisfied, or otherwise, forward recursively inferring again the surrounding vehicle future finite step states within the ego vehicle sensing range and calculating the uncertainty metric.

5. A prediction-type intelligent vehicle decision control apparatus, comprising:

a first generation module configured to establish a prediction model for surrounding traffic participants based on map information and historical tracks of the traffic participants, and perform parameter initialization on the prediction model by using a labeled data set to generate an initial surrounding vehicle motion prediction model;

a second generation module configured to cyclically update the initial surrounding vehicle motion prediction model according to continuous interaction data with an environment by taking a driving target of an intelligent vehicle as an optimization object, so as to generate a final surrounding vehicle motion prediction model; and a control module configured to embed the final surrounding vehicle motion prediction model into a decision control system of the intelligent vehicle, such that the decision control system generates a corresponding decision control instruction according to a surrounding vehicle motion predicted by the final surrounding vehicle motion prediction model, and controls the intelligent vehicle to execute the decision control instruction;

wherein the second generation module is specifically configured to:

perform graph neural network-based message-passing aggregation updating on input node features, and perform multi-axis information transmission based on an attention mechanism at a level of aggregated features to obtain new aggregated features; and decode the new aggregated features, calculate a minimum quadratic error between an output intended prediction probability and a predicted track and true values in the labeled data set, so as to obtain an objective function and a gradient for updating the prediction model, and perform back propagation updates on parameters of the prediction model, so as to obtain the final surrounding vehicle motion prediction model.

6. The apparatus according to claim 5, wherein the first generation module is specifically configured to:

perform vectorized encoding on the map information and the historical tracks in the labeled data set.

7. The apparatus according to claim 5, wherein the control module is specifically configured to forward recursively infer, using the final surrounding vehicle motion prediction model, surrounding vehicle future finite step states within an ego vehicle sensing range, and calculate an uncertainty metric;

acquire ego vehicle future finite step states based on the surrounding vehicle future finite step states and the uncertainty metric, obtain a value function based on the decision control system, and calculate a corresponding updated objective function and a corresponding updated gradient; and while updating parameters of the decision control system according to the objective function and the gradient, obtain an optimal control strategy, and generate the decision control instruction.

8. The apparatus according to claim 7, wherein the control module is further configured to:

detect whether the optimal control strategy satisfies a security threshold condition; and generate the decision control instruction if the security threshold condition is satisfied, or otherwise, forward recursively infer again the surrounding vehicle future finite step states within the ego vehicle sensing range and calculating the uncertainty metric.

9. A vehicle, comprising: a memory, a processor, and a computer program stored on the memory and executable on the processor, the processor executing the program to implement the prediction-type intelligent vehicle decision control method according to claim 1.

10. The vehicle according to claim 9, wherein the establishing the prediction model for surrounding traffic participants based on map information and historical tracks of the traffic participants, and performing parameter initialization on the prediction model by using the labeled data set to generate the initial surrounding vehicle motion prediction model comprises:

performing vectorized encoding on the map information and the historical tracks in the labeled data set.

11. The vehicle according to claim 9, wherein the decision control system generating the corresponding decision control instruction according to the surrounding vehicle motion predicted by the final surrounding vehicle motion prediction model comprises:

forward recursively inferring, using the final surrounding vehicle motion prediction model, surrounding vehicle future finite step states within an ego vehicle sensing range, and calculating an uncertainty metric;

acquiring ego vehicle future finite step states based on the surrounding vehicle future finite step states and the uncertainty metric, obtaining a value function based on the decision control system, and calculating a corresponding updated objective function and a corresponding updated gradient; and while updating parameters of the decision control system according to the objective function and the gradient, obtaining an optimal control strategy, and generating the decision control instruction.

12. The vehicle according to claim 11, wherein the decision control system generating the corresponding decision control instruction according to the surrounding vehicle motion predicted by the final surrounding vehicle motion prediction model further comprises:

detecting whether the optimal control strategy satisfies a security threshold condition; and generating the decision control instruction if the security threshold condition is satisfied, or otherwise, forward recursively inferring again the surrounding vehicle future finite step states within the ego vehicle sensing range and calculating the uncertainty metric.

13. A non-transitory computer-readable storage medium having a computer program stored thereon, wherein the program is executed by a processor for implementing the prediction-type intelligent vehicle decision control method according to claim 1.

14. The non-transitory computer-readable storage medium according to claim 13, wherein the establishing the prediction model for surrounding traffic participants based on map information and historical tracks of the traffic participants, and performing parameter initialization on the prediction model by using the labeled data set to generate the initial surrounding vehicle motion prediction model comprises:
performing vectorized encoding on the map information and the historical tracks in the labeled data set.

15. The non-transitory computer-readable storage medium according to claim 13, wherein the decision control system generating the corresponding decision control instruction according to the surrounding vehicle motion predicted by the final surrounding vehicle motion prediction model comprises:
forward recursively inferring, using the final surrounding vehicle motion prediction model, surrounding vehicle future finite step states within an ego vehicle sensing range, and calculating an uncertainty metric;
acquiring ego vehicle future finite step states based on the surrounding vehicle future finite step states and the uncertainty metric, obtaining a value function based on the decision control system, and calculating a corresponding updated objective function and a corresponding updated gradient; and
while updating parameters of the decision control system according to the objective function and the gradient, obtaining an optimal control strategy, and generating the decision control instruction.

16. The non-transitory computer-readable storage medium according to claim 15, wherein the decision control system generating the corresponding decision control instruction according to the surrounding vehicle motion predicted by the final surrounding vehicle motion prediction model further comprises:
detecting whether the optimal control strategy satisfies a security threshold condition; and
generating the decision control instruction if the security threshold condition is satisfied, or otherwise, forward recursively inferring again the surrounding vehicle future finite step states within the ego vehicle sensing range and calculating the uncertainty metric.

* * * * *